US011678426B2

(12) United States Patent
Slupik et al.

(10) Patent No.: US 11,678,426 B2
(45) **Date of Patent: *Jun. 13, 2023**

(54) COMMISSIONING MESH NETWORK-CAPABLE DEVICES, BASED ON FUNCTIONS ASSOCIATED WITH A SCENARIO ASSIGNED TO A SPACE

(71) Applicant: Silvair Sp. z o.o., Cracow (PL)

(72) Inventors: Szymon Slupik, Cracow (PL); Adam Gembala, Cracow (PL); Maciej Witalinski, Jaworzno (PL); Piotr Hawranek, Bibice (PL); Pawel Smietanka, Cracow (PL); Michal Hobot, Cracow (PL)

(73) Assignee: Silvair Sp. z o.o., Cracow (PL)

( * ) Notice: Subject to any disclaimer, the term of this patent is extended or adjusted under 35 U.S.C. 154(b) by 0 days.

This patent is subject to a terminal disclaimer.

(21) Appl. No.: 17/480,486

(22) Filed: Sep. 21, 2021

(65) Prior Publication Data

US 2022/0007486 A1 Jan. 6, 2022

Related U.S. Application Data

(63) Continuation of application No. 16/453,879, filed on Jun. 26, 2019, now Pat. No. 11,172,564, which is a (Continued)

(51) Int. Cl.
*H05B 47/19* (2020.01)
*H04L 41/12* (2022.01)

(52) U.S. Cl.
CPC ............. *H05B 47/19* (2020.01); *H04L 41/12* (2013.01)

(58) Field of Classification Search
CPC . H05B 47/19; H04L 12/2803; H04L 12/2816; H04L 41/12; Y02B 20/40
See application file for complete search history.

(56) References Cited

U.S. PATENT DOCUMENTS 4,918,690 A 4/1990 Markkula, Jr. et al.
4,969,147 A 11/1990 Markkula, Jr. et al.

(Continued)

FOREIGN PATENT DOCUMENTS

CN 114025312 A * 2/2022
WO WO-2010056105 A2 * 5/2010 ......... H04L 12/1886

(Continued)

OTHER PUBLICATIONS

Dandelski et al., Scalability of Dense Wireless Lighting Control Networks, Jan. 2015, IEEE Communications Magazine, vol. 53, No. 1, pp. 157-165, DOI: 10.1109/MCOM.2015.7010529 (Year: 2015).*

(Continued)

*Primary Examiner* — Eric Nowlin
(74) *Attorney, Agent, or Firm* — McGeary Cukor, LLC; Kenneth Ottesen; Jason Paul DeMont

(57) ABSTRACT

A commissioning system and method that applies a design configuration, representative of a building automation and control system, to a mesh network of network-capable devices. A cloud-based server system works in concert with an installing device, such as a smartphone or tablet, to apply the relevant configuration of scenarios and spaces, as defined in the design configuration during a design phase, to each mesh node in the mesh network. The commissioning system first transforms the defined scenarios and spaces, (Continued)

which essentially represent a logical configuration of the building automation and control system, into a network-centric configuration. Then, the system decomposes the network-centric configuration into a physical configuration of each mesh node, resulting in a set of parameters for each mesh node. The commissioning system then transmits the set of parameters, including one or more group addresses, to the applicable mesh node, for each affected mesh node in the network

18 Claims, 10 Drawing Sheets

Related U.S. Application Data continuation of application No. 15/910,338, filed on Mar. 2, 2018, now Pat. No. 10,382,284.

(56) References Cited

U.S. PATENT DOCUMENTS 5,963,253 A 10/1999 Dwyer
6,353,853 B1 3/2002 Gravlin
6,580,950 B1 6/2003 Johnson et al.
6,756,998 B1 6/2004 Bilger
6,792,319 B1 9/2004 Bilger
6,873,610 B1 3/2005 Noever
6,891,838 B1 5/2005 Petite et al.
6,909,921 B1 6/2005 Bilger
6,912,429 B1 6/2005 Bilger
7,092,772 B2 8/2006 Murray et al.
7,437,596 B2 10/2008 McFarland
7,486,193 B2 2/2009 Elwell
7,555,658 B2 6/2009 Vahid et al.
7,680,745 B2 3/2010 Hunter
7,817,994 B2 10/2010 Funk et al.
7,826,450 B2 * 11/2010 Lin ........................ H04L 45/00 370/432
8,001,219 B2 8/2011 Moorer et al.
8,013,732 B2 9/2011 Petite et al.
8,023,440 B2 9/2011 Nass et al.
8,050,801 B2 11/2011 Richards et al.
8,155,142 B2 4/2012 Moorer et al.
8,209,398 B2 6/2012 Moorer et al.
8,271,881 B2 9/2012 Moorer et al.
8,275,471 B2 9/2012 Huizenga et al.
8,681,676 B2 3/2014 Budampati et al.
8,725,845 B2 5/2014 Moorer et al.
8,793,022 B2 7/2014 Uden
8,806,209 B2 8/2014 Hemphill et al.
9,036,560 B2 * 5/2015 Chen ...................... H04W 4/38 370/328
9,049,038 B2 6/2015 Cavalcanti
9,210,192 B1 12/2015 Kim et al.
9,374,874 B1 6/2016 Ewing
9,455,802 B2 * 9/2016 Banks ............... H04W 52/0209
9,820,361 B1 * 11/2017 Turvy, Jr. ............... H04M 11/00
9,867,260 B2 1/2018 Kicklighter et al.
9,945,574 B1 4/2018 Sloo et al.
10,057,062 B2 8/2018 Nadathur et al.
10,057,931 B2 * 8/2018 Roquemore, III .... H04L 67/141
10,143,067 B1 11/2018 Slupik et al.
10,172,219 B2 * 1/2019 Turvy, Jr. ............... H04M 11/00
10,200,504 B2 2/2019 Decenzo et al.
10,218,794 B2 2/2019 Slupik
10,251,245 B2 * 4/2019 Roberts .................. G06V 20/52
10,333,731 B2 6/2019 Ebrom et al.
10,339,791 B2 7/2019 Baum et al.
10,355,921 B2 * 7/2019 Turvy, Jr. ............... G08C 17/02
10,359,746 B2 7/2019 Slupik et al.
10,365,619 B2 7/2019 Mousavi et al.
10,382,284 B1 8/2019 Slupik et al.
10,382,452 B1 8/2019 Dawes et al.
10,389,736 B2 8/2019 Dawes et al.
10,564,613 B2 * 2/2020 Weber .................... G05B 15/02
10,754,304 B2 8/2020 Raji et al.
10,834,802 B2 * 11/2020 Knauss ................ H05B 47/185
11,012,534 B2 * 5/2021 Andreola ................ H04L 67/34
11,234,106 B2 * 1/2022 Douglas ................ H04W 12/03
11,240,900 B2 * 2/2022 Knauss ................ H05B 47/185
2003/0040812 A1 2/2003 Gonzales et al.
2003/0137396 A1 7/2003 Durej et al.
2006/0028997 A1 2/2006 McFarland
2006/0074494 A1 4/2006 McFarland
2007/0060147 A1 3/2007 Shin et al.
2007/0156256 A1 7/2007 Jung
2007/0232288 A1 10/2007 McFarland et al.
2008/0191866 A1 8/2008 Falck et al.
2008/0298302 A1 12/2008 Ishida
2009/0066473 A1 3/2009 Simons
2009/0141741 A1 6/2009 Kim et al.
2009/0222541 A1 9/2009 Monga et al.
2010/0008272 A1 1/2010 Messinger et al.
2010/0074234 A1 3/2010 Banks et al.
2010/0236824 A1 9/2010 Roosli
2011/0069665 A1 3/2011 Erdmann et al.
2011/0080264 A1 4/2011 Clare et al.
2011/0213867 A1 9/2011 McCoy et al.
2012/0066168 A1 3/2012 Fadell et al.
2012/0136485 A1 * 5/2012 Weber .................... G05B 15/02 700/275
2012/0080893 A1 6/2012 Aoun et al.
2013/0085615 A1 4/2013 Barker
2013/0109406 A1 5/2013 Meador et al.
2013/0132609 A1 5/2013 Meier
2013/0181848 A1 * 7/2013 Picard .................... G01D 4/006 340/870.03
2013/0285574 A1 10/2013 Garcia Morchon et al.
2013/0291100 A1 10/2013 Ganapathy et al.
2013/0335219 A1 12/2013 Malkowski
2014/0107846 A1 4/2014 Li
2014/0163751 A1 6/2014 Davis et al.
2014/0244044 A1 8/2014 Davis et al.
2014/0269429 A1 * 9/2014 Chen ................... H04W 40/246 370/254
2014/0293276 A1 10/2014 Hughes et al.
2014/0328211 A1 11/2014 Holleis et al.
2014/0336821 A1 11/2014 Blaine
2014/0358285 A1 12/2014 Aggarwal et al.
2015/0347916 A1 12/2015 Warren et al.
2016/0170389 A1 6/2016 Im et al.
2016/0234186 A1 8/2016 Leblond et al.
2016/0234649 A1 8/2016 Finnerty et al.
2016/0327921 A1 11/2016 Ribbich et al.
2016/0344670 A1 11/2016 Wu et al.
2016/0381144 A1 12/2016 Malik et al.
2017/0016643 A1 1/2017 Combe et al.
2017/0034123 A1 2/2017 Ritmanich et al.
2017/0118636 A1 4/2017 Zoorob
2017/0171071 A1 6/2017 Turon
2017/0231066 A1 * 8/2017 Roberts ..................... F21V 5/04
2017/0289255 A1 * 10/2017 Urquhart ................. H04L 43/16
2017/0311415 A1 10/2017 Rozendaal et al.
2018/0004178 A1 1/2018 Haines et al.
2018/0026836 A1 * 1/2018 Turvy, Jr. .............. H04W 76/10 709/220
2018/0027598 A1 * 1/2018 Roquemore, III .... H04L 67/141 370/254
2018/0255506 A1 * 9/2018 Wang ................... H04B 17/318
2018/0310387 A1 * 10/2018 Turvy, Jr. ................ H04L 12/44
2019/0020494 A1 1/2019 Roosli
2019/0190741 A1 6/2019 Wendt
2019/0239033 A1 * 8/2019 Douglas .............. H04W 12/033
2019/0373706 A1 * 12/2019 Wang ................... H05B 47/105
2019/0379764 A1 * 12/2019 Andreola .............. H04L 67/125
2020/0068688 A1 * 2/2020 Knauss ................ H05B 47/185
2020/0389966 A1 * 12/2020 Amrine .................. H05B 47/19
2021/0084734 A1 * 3/2021 Knauss ................ H05B 47/185

(56) References Cited

U.S. PATENT DOCUMENTS

2021/0218588 A1* 7/2021 Skillermark .......... H04L 12/185
2022/0124897 A1* 4/2022 Knauss ................ H05B 47/185

FOREIGN PATENT DOCUMENTS

WO WO-2010056105 A3 * 8/2010 ......... H04L 12/1886
WO 2018024528 A1 2/2018

OTHER PUBLICATIONS

Cordeiro et al., Multicast over Wireless Mobile Ad Hoc Networks: Present and Future Directions, Feb. 2003, IEEE Network, vol. 17, No. 1, pp. 52-59, DOI: 10.1109/MNET.2003.1174178 (Year: 2003).*
Examiner Daniel C. Murray, Related U.S. Appl. No. 15/479,093, Notice of Allowance, dated Mar. 21, 2019.
Examiner Daniel C. Murray, Related U.S. Appl. No. 16/417,400, Office action dated Sep. 3, 2019.
Examiner Feben Haile, Related U.S. Appl. No. 15/910,338 Notice of Allowance, dated Apr. 18, 2019.
International Search Report, PCT/US2019/019365, dated Jun. 25, 2019.
Written Opinion of the International Search Authority, PCT/US2019/019365, dated Jun. 25, 2019.
Examiner Daniel C. Murray, Related U.S. Appl. No. 16/417,400, Notice of Allowance, dated Oct. 15, 2019.
Examiner Daniel C. Murray, Related U.S. Appl. No. 16/711,696, Office action dated Jul. 21, 2020.
Examiner Daniel C. Murray, Related U.S. Appl. No. 16/711,696, Notice of Allowance dated Aug. 28, 2020.
International Preliminary Report on Patentability, PCT/US2019/019365, dated Sep. 8, 2020.
European Patent Office Rule 161 Communication, EP application No. 19710234.6, dated Oct. 13, 2020.
Examiner Eric Nowlin, Related U.S. Appl. No. 16/453,879, Office action dated Mar. 3, 2021.
Examiner Eric Nowlin, Related U.S. Appl. No. 16/453,879, Notice of Allowance dated Jul. 15, 2021.
Examiner Eric Nowlin, Related U.S. Appl. No. 16/453,879, Notice of References dated Mar. 3, 2021.
Kastner, Wolfgang et al. "Communication Systems for Building Automation and Control", Jun. 6, 2005, IEEE, vol. 93, pp. 1178-1203.
European Patent Office Communication under Rule 71(3) EPC—Intention to Grant, EP application No. 19710234.6, dated Jan. 10, 2023.
Related U.S. Appl. No. 17/070,220, Office action dated Apr. 13, 2023.

* cited by examiner

131

131

COMMISSIONING MESH NETWORK-CAPABLE DEVICES, BASED ON FUNCTIONS ASSOCIATED WITH A SCENARIO ASSIGNED TO A SPACE

CROSS REFERENCE TO RELATED APPLICATIONS

This application is related to "System and Method for Commissioning Mesh Network-Capable Devices within a Building Automation and Control System," U.S. application Ser. No. 15/910,338 and "Method for Commissioning Mesh Network-Capable Devices, Including Mapping of Provisioned Nodes," U.S. application Ser. No. 16/453,879, both of which are incorporated by reference herein.

FIELD OF THE INVENTION

The present invention relates to building automation and control in general, and, more particularly, to a mesh network commissioning system and method.

BACKGROUND OF THE INVENTION

"Commercial building automation," or "commercial automation," refers to the use of computer and information technology to control commercial building systems, such as lighting, HVAC, audio-visual, smoke detection, security, and shading, among others. Using specialized hardware and control logic, building devices can monitor their environment and can be controlled automatically. Although commercial automation has been available at some level of sophistication for some time, it steadily becomes more practical, both from a technological and cost perspective.

Lighting automation, in particular, has evolved over time. Lighting systems now exist in which luminaires that comprise sensors, lamps, and control logic are networked together, in what is sometimes referred to as "connected lighting" or networked "smart lighting." In such a network, the sensors that are associated with the luminaires collect data about the local environment, such as data related to occupancy and data related to ambient lighting in the vicinity of the luminaires. The networked luminaires communicate with each other, in some cases sharing the sensor data, and adjust the light output of the lamps via the control logic, with some level of coordination across the networked luminaires and other types of connected devices that are networked with one another.

There can be large numbers of such connected devices within a building, numbering in the hundreds, or even thousands, of devices sharing data with one another. Consequently, there are various issues to consider in planning and implementing a system of connected devices, so that the devices are installed and operate in a coordinated way.

SUMMARY OF THE INVENTION

Mesh networks are presently available that enable a plurality of network-capable devices to form a network and share data with one another as a plurality of provisioned mesh-network nodes. However, a mesh network by itself does not address the daunting challenge of installing the hundreds, or thousands, of such devices on each building floor, in regard to how they should behave in the presence of one another. For example, in at least some installation procedures in the prior art, an installation technician has to somehow program each device in each building space to behave according to one or more operational scenarios, each of which possibly involving many devices. This is particularly challenging, considering that different building spaces have different devices that can operate according to different scenarios, and that somehow these considerations must be applied to a decentralized system of mesh nodes.

As part of a commissioning process, the present invention enables network-capable devices, which are connected to one another as provisioned nodes within a mesh network, to interoperate with one another without at least some of the disadvantages in the prior art. In accordance with the illustrative embodiment of the present invention, a commissioning system and method disclosed herein applies a design configuration, for a building automation and control system, to a mesh network (e.g., Bluetooth®, etc.) of network-capable nodes. As part of the commissioning system, a cloud-based server system works in concert with an installing device, such as a smartphone or tablet executing an installer application, to apply the relevant configuration of scenarios and spaces, as defined in the design configuration during the design phase, to each mesh node in the mesh network.

The commissioning system of the illustrative embodiment accomplishes this by first transforming the defined scenarios and spaces, which essentially represent a logical configuration of the building automation and control system. The commissioning system transforms the defined scenarios and spaces into a network-centric configuration. Then, the system decomposes the network-centric configuration into a physical configuration of each mesh node, resulting in a set of parameters for each mesh node. The system then transmits the set of parameters, including one or more group addresses, to the applicable mesh node, for each affected mesh node in the network. The transformation and decomposition operations can be performed by a cloud service's data-processing system, or by the installing device, or by a combination of the two.

By performing the transformation and decomposition of scenarios and spaces into a physical configuration of each mesh node, the commissioning system and method of the illustrative embodiment eliminates, or at least greatly reduces, mistakes that are related to the configuring of connected devices.

A first illustrative method for commissioning a plurality of nodes in a data network comprises: retrieving, by a data-processing system, configuration data from a database, wherein the configuration data represents (i) the placement of each of a plurality of devices in relation to a first space within a building, wherein the first space is user defined in the database, and (ii) a first scenario assigned to the first space; providing, by the data-processing system through an intermediary device, a non-empty set of unicast network addresses to a respective first set of nodes in the plurality of nodes, such that each node in the first set of nodes is configured to regard each respective unicast address as an address that uniquely identifies the node in the data network; receiving, by the data-processing system from the intermediary device, information that maps each node in a subset of the first set of nodes to each respective node in a second set of nodes, wherein the second set of nodes corresponds to at least some of the plurality of devices whose placements are represented in the database; generating, by the data-processing system, a first group address that is based on (i) the first space and (ii) functions performed by the second set of nodes in performing the first scenario assigned to the first space; and providing, by the data-processing system through the intermediary device, the first group address to the second set of nodes as identified by their respective unicast addresses, wherein the first group address is transmitted such that each subscribing node in the second set of nodes is configured to be responsive to one or more received messages containing the first group address in the destination address field of the one or more received messages.

A second illustrative method for commissioning a plurality of nodes in a data network comprises: receiving, by a first device, configuration data in a database from a first server computer, wherein the configuration data represents (i) the placement of each of a plurality of devices in relation to a first space within a building, wherein the first space is user defined in the database, and (ii) a first scenario assigned to the first space; transmitting, by the first device, a non-empty set of unicast network addresses to a respective non-empty first set of nodes in the plurality of nodes, such that each node in the first set of nodes is configured to regard each respective unicast address as an address that uniquely identifies the node in the data network; mapping, by the first device, each node in a subset of the first set of nodes to each respective node in a second set of nodes, wherein the second set of nodes corresponds to at least some of the plurality of devices whose placements are represented in the database; generating, by the first device, a first group address that is based on (i) the first space and (ii) functions performed by the second set of nodes in performing the first scenario assigned to the first space; and transmitting, by the first device, the first group address to the second set of nodes as identified by their respective unicast addresses, wherein the first group address is transmitted such that each subscribing node in the second set of nodes is configured to be responsive to one or more received messages containing the first group address in the destination address field of the one or more received messages.

DETAILED DESCRIPTION

Figure 1:
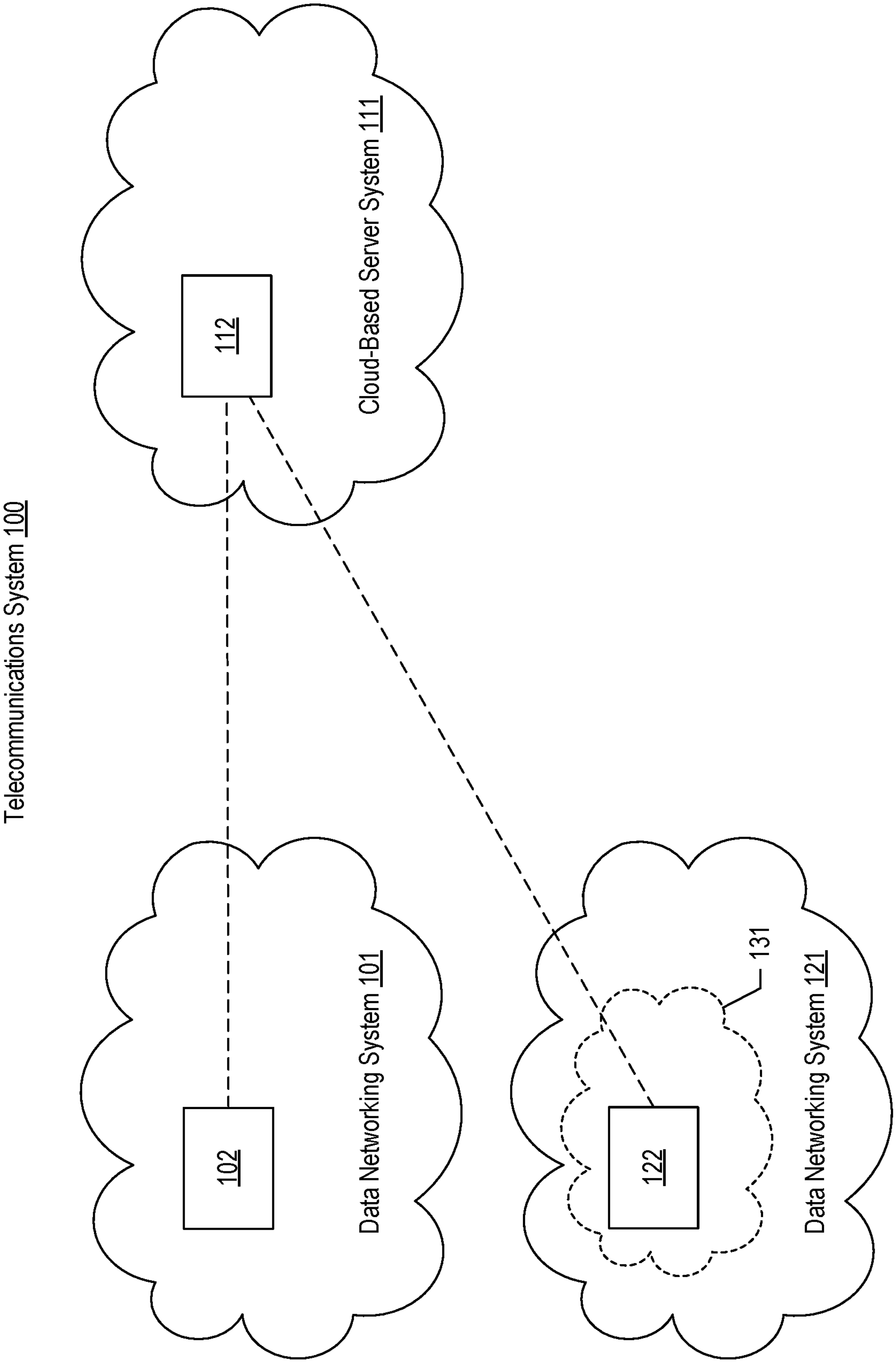
FIG. 1 depicts telecommunications system 100, in accordance with an illustrative embodiment of the present invention.

Based on—For the purposes of this specification, the phrase "based on" is defined as "being dependent on" in contrast to "being independent of". The value of Y is dependent on the value of X when the value of Y is different for two or more values of X. The value of Y is independent of the value of X when the value of Y is the same for all values of X. Being "based on" includes both functions and relations.

Control—For the purposes of this specification, the infinitive "to control" and its inflected forms (e.g., "controlling", "controlled", etc.) should be given the ordinary and customary meaning that the terms would have to a person of ordinary skill in the art at the time of the invention.

Controller—For the purposes of this specification, the term "controller" is defined as hardware or hardware and software that perform mathematical and/or logical operations and that control other devices based, at least in part, on the operations performed.

Generate—For the purposes of this specification, the infinitive "to generate" and its inflected forms (e.g., "generating", "generated", etc.) should be given the ordinary and customary meaning that the terms would have to a person of ordinary skill in the art at the time of the invention.

Lamp—For the purposes of this specification, the term "lamp" is defined as a device for providing illumination, comprising an electric bulb and its holder.

Luminaire—For the purposes of this specification, the term "luminaire" is defined as a lighting unit comprising a lamp and a controller for controlling the lamp.

Map—For the purposes of this specification, the infinitive "to map" and its inflected forms (e.g., "mapping", "mapped", etc.) should be given the ordinary and customary meaning that the terms would have to a person of ordinary skill in the art at the time of the invention.

Network address—For the purposes of this specification, the term "network address," or "computer network address," is defined as a numerical label assigned to each device (e.g., sensor node, actor node, configuring node, etc.) participating in a computer (or data) network. For example, an Internet Protocol address (IP address) is a numerical label assigned to each device participating in a computer network that uses the Internet Protocol for communication.

Scenario—For the purposes of this specification, the term "scenario" is defined as a predefined, collective behavior of one or more devices.

Space—For the purposes of this specification, the term "space" is defined as a continuous area within a building premises. In this context, a space is a controllable unit to which one or more scenarios can be applied.

Receive—For the purposes of this specification, the infinitive "to receive" and its inflected forms (e.g., "receiving", "received", etc.) should be given the ordinary and customary meaning that the terms would have to a person of ordinary skill in the art at the time of the invention.

Transmit—For the purposes of this specification, the infinitive "to transmit" and its inflected forms (e.g., "transmitting", "transmitted", etc.) should be given the ordinary and customary meaning that the terms would have to a person of ordinary skill in the art at the time of the invention.

To facilitate explanation and understanding of the present invention, the following description sets forth several details. However, it will be clear to those having ordinary skill in the art, after reading the present disclosure, that the present invention may be practiced without these specific details, or with an equivalent solution or configuration. Furthermore, some structures, devices, and operations that are well known in the art are depicted in block diagram form in the accompanying figures in order to keep salient aspects of the present invention from being unnecessarily obscured.

FIG. 1 depicts telecommunications system 100, in accordance with the illustrative embodiment of the present invention. System 100 comprises: design data-networking system 101, browser device 102, cloud server system 111, server computer 112, installation data-networking system 121 comprising mesh data network 131, and wireless device 122. The aforementioned elements are interrelated as shown.

In addition to what is described below and in regard to the depicted elements, telecommunications system 100 comprises a collection of links and nodes that enable telecommunication between devices, in well-known fashion. To this end, in some embodiments of the present invention, telecommunications system 100 comprises the Internet, while in some other embodiments of the present invention, system 100 comprises the Public Switched Telephone Network (PSTN), while in still some other embodiments of the present invention, system 100 comprises a private data network. It will be clear to those with ordinary skill in the art, after reading this disclosure, that in some embodiments of the present invention system 100 can comprise one or more of the above-mentioned networks and/or other telecommunications networks, without limitation. Furthermore, it will be clear to those will ordinary skill in the art, after reading this disclosure, that telecommunications system 100 can comprise elements that are capable of wired and/or wireless communication, without limitation.

Data networking system 101 is a collection of software and hardware that is used by a software application that is executed by browser device 102, by interacting with cloud server system 111. Networking system 101 comprises one or more computers having non-transitory memory, processing components, and communication components, including browser device 102. Data networking system 101 enables communication between browser device 102 and cloud server system 111, including server computer 112. To this end, networking system 101 comprises one or both of wired Ethernet, and WiFi. However, as those who are skilled in the art will appreciate after reading this specification, data networking system 101 can be based on one or more different types of wired and/or wireless network technology standards, in addition to or instead of those mentioned above, such as Bluetooth mesh networking, Z-Wave, ZigBee, Thread, Wi-Fi, straight Bluetooth Low Energy (BLE), classic Bluetooth, for example and without limitation.

Browser device 102 is a personal (desktop) computer executing a web application that is browser-based, in accordance with the illustrative embodiment. The web application enables the design of a collection of network-capable devices (e.g., lights, switches, sensors, etc.) prior to an installation process. In particular, the designer application enables the design of and uploading of floor plans to a building configuration database maintained by server computer 112, including the defining of spaces on the floor plans. These operations include those depicted in FIG. 5. The designer application also enables the assignment of scenarios to the spaces defined and the fine-tuning of the assigned scenarios (e.g., light levels, timings, scenes, etc.). In some embodiments of the present invention, device 102 is a different type of data-processing system, or executes a designer application that is different than a browser-based application, or both.

Cloud-based server system 111, which is a data-processing system, is a collection of software and hardware that is used to manage the configuration database stored by server computer 112, by interacting with browser device 102 within data networking system 101 and wireless device 122 within data networking system 121. System 111 is also used to manage user accounts (e.g., designers, installers, contractors, etc.) and projects (e.g., buildings, configurations, etc.). System 111 comprises one or more computers having non-transitory memory, processing components, and communication components, including server computer 112. As a computing device, server computer 112 comprises one or more processors, memories, and network interface modules, which are interconnected and interoperate in well-known fashion.

Figure 6:
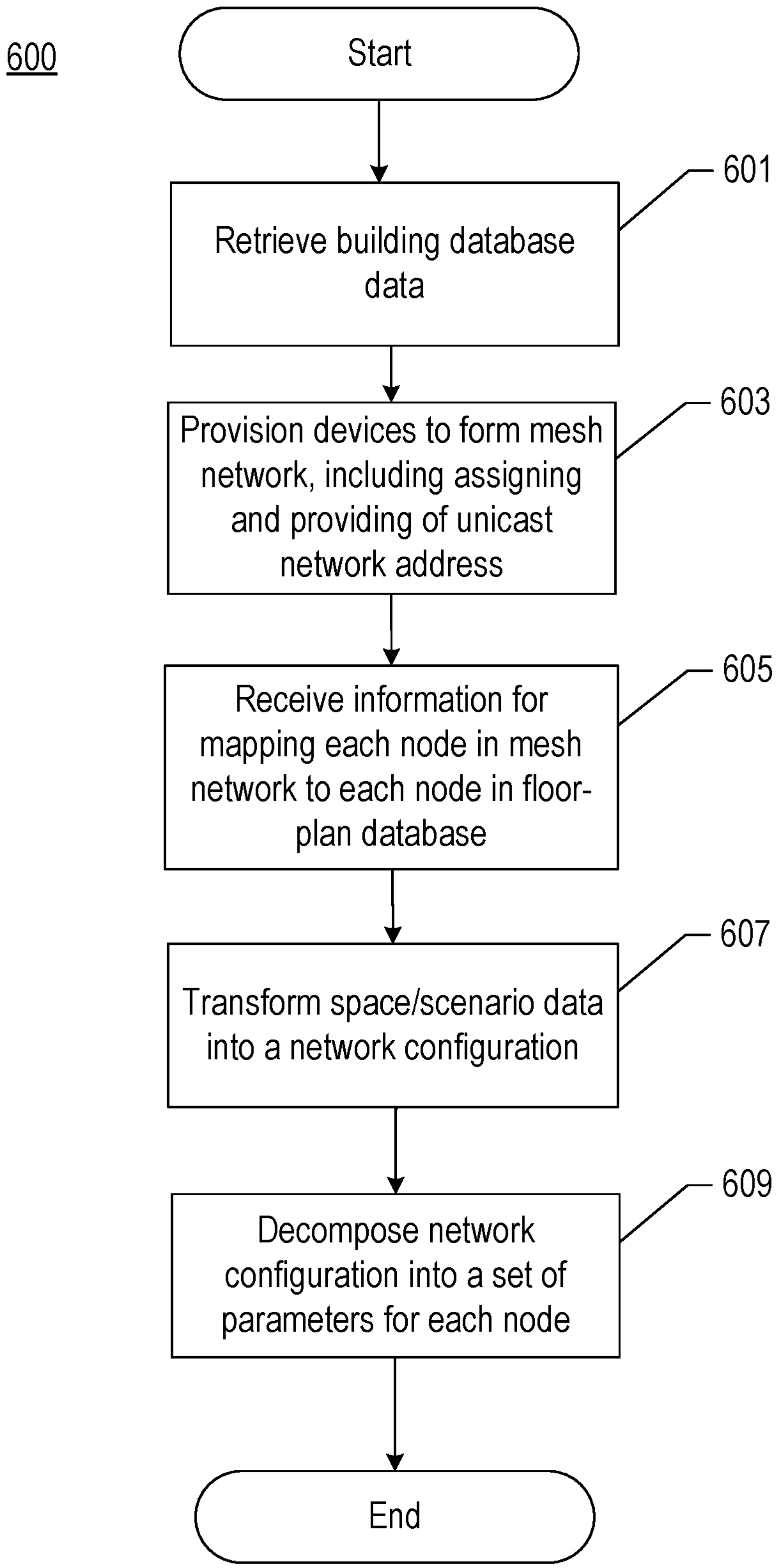
FIG. 6 depicts salient operations of method 600 according to the commissioning system of the illustrative embodiment, by which various functions are performed related to installing nodes 201-1 through 201-M in mesh network 131.
Figure 7:
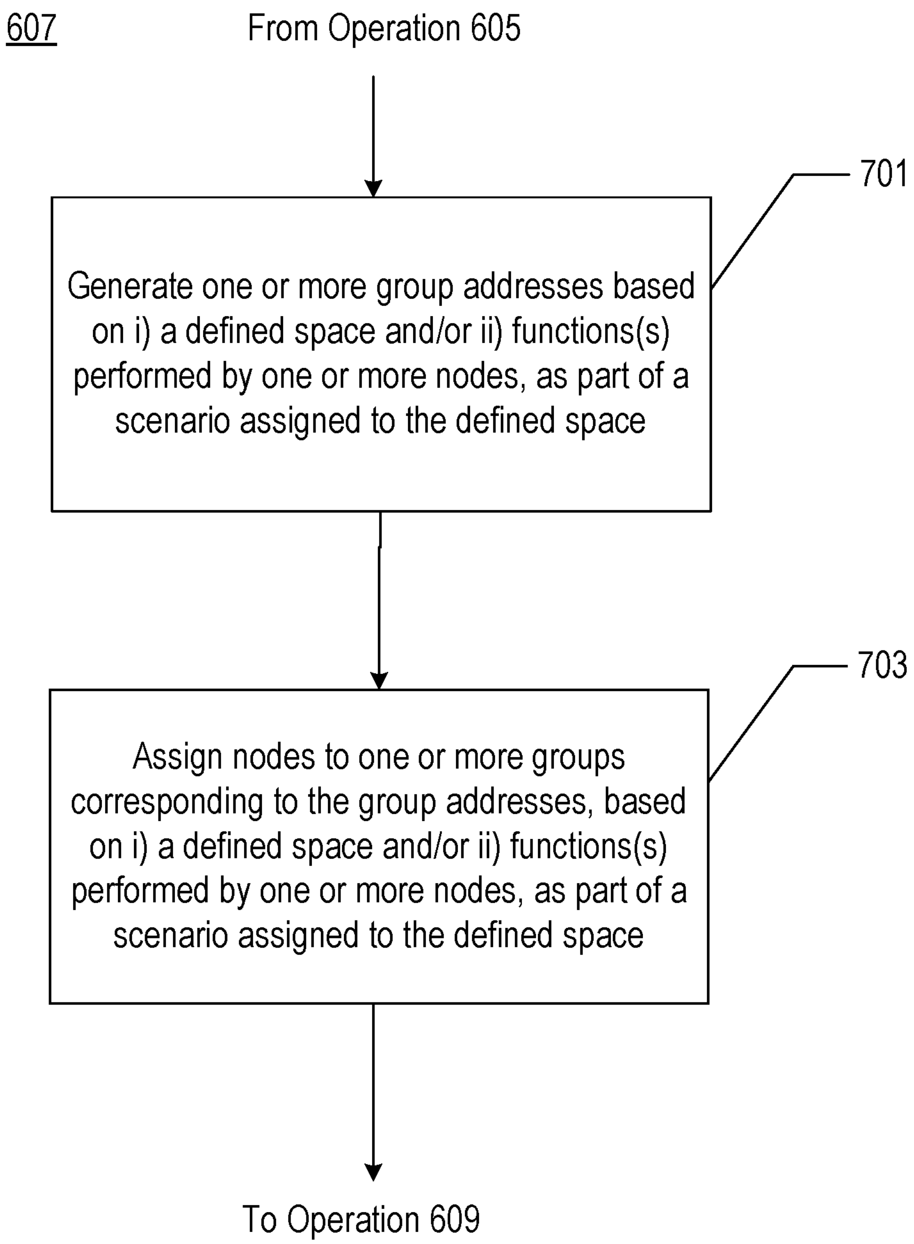
FIG. 7 depicts salient sub-operations within operation 607, by which data-processing system 111 transforms the scenarios and spaces, as representing a logical configuration, into a network-centric configuration.
Figure 8:
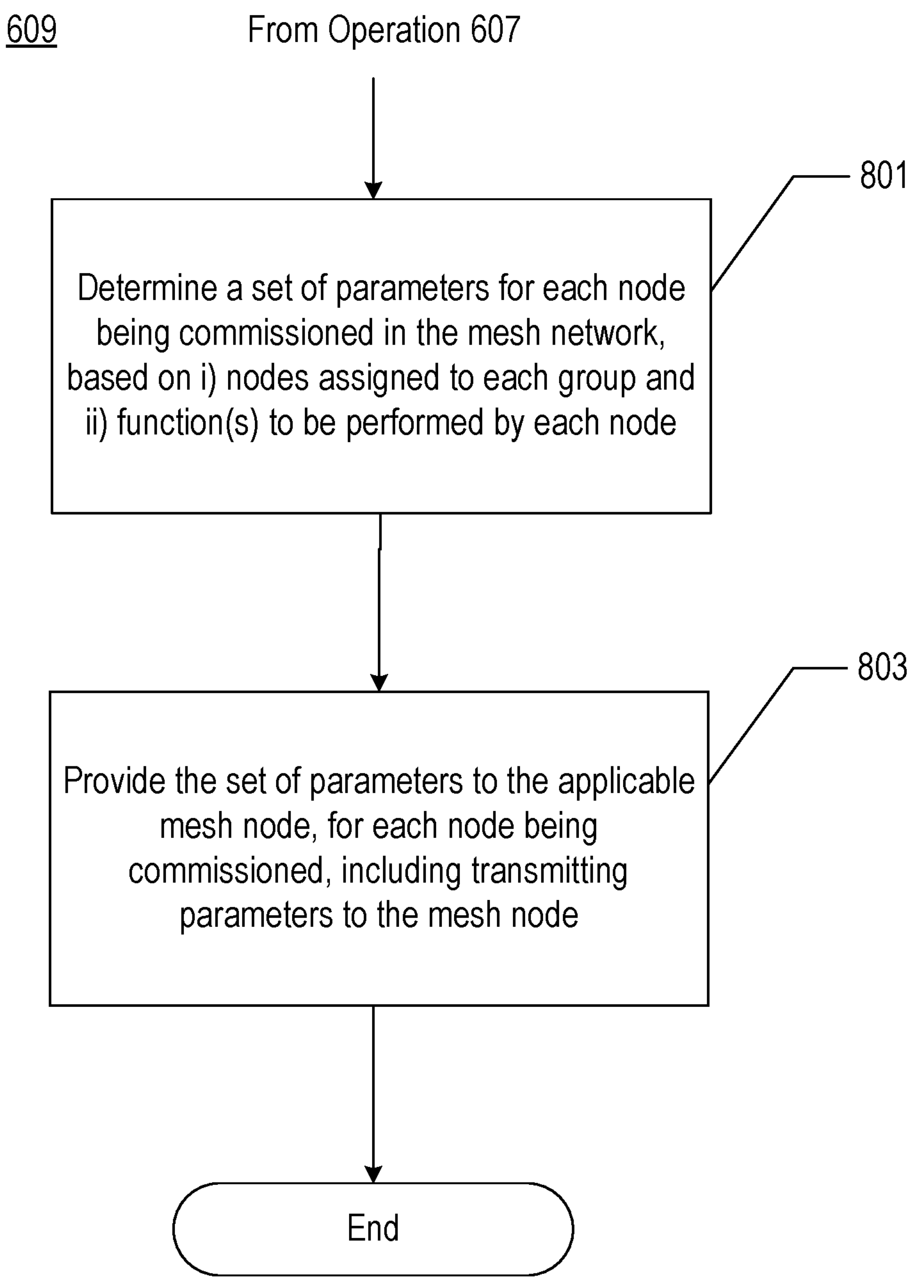
FIG. 8 depicts salient sub-operations within operation 609, by which data-processing system 111 takes the network-centric configuration obtained in accordance with operation 607 and decomposes it into a physical configuration of each mesh node

In accordance with the illustrative embodiment, cloud server system 111 also performs the transformation and decomposition operations described below and in regard to FIGS. 6 through 8. These operations can be performed by server computer 112 within cloud server system 111 or by a different server computer within system 111. In some alternative embodiments of the present invention, cloud server system 111 performs transformation, but not decomposition, while in some other alternative embodiments, cloud server system 111 performs decomposition, but not transformation, while in still some other alternative embodiments, both transformation and decomposition are performed elsewhere (e.g., by installing device 122, etc.).

In order for devices within cloud server system 111 to communicate with devices in other networks (e.g., devices 102 and 122, etc.) and with one another, system 111 comprises one or both of wired Ethernet and WiFi networks. However, as those who are skilled in the art will appreciate after reading this specification, a different combination of wired and/or wireless networks can be used within and by system 111 in order to enable communication. For example and without limitation, cloud server system 111 may use a mobile data communication in accordance with a cellular network standard (e.g., 3G, 4G, 5G, LTE, GSM, etc.) to communicate with device 102 and/or device 122, thereby avoiding usage of the WiFi network of the local premises.

As described, the data-processing system depicted as cloud-based server system 111 is part of a cloud-based service. As those who are skilled in the art will appreciate after reading this specification, in some alternative embodiments of the present invention, the data-processing system performing the operations associated with system 111 as described can comprise one or more computing devices that are not part of any cloud-based system and that perform said operations.

Data networking system 121 is a collection of software and hardware that is used by an installer application that is executed by wireless device 122, by interacting with cloud server system 111. Networking system 121 comprises one or more computers having non-transitory memory, processing components, and communication components, including wireless device 122. Data networking system 121 enables communication between wireless device 122 and cloud server system 111, including server computer 112. System 121 further comprises mesh data network 131, which enables communication amongst wireless device 122 and other devices as described below and in regard to FIG. 2.

In order to enable communication amongst the various devices, networking system 121 comprises one or more of wired Ethernet, WiFi, mobile data networks (e.g., 3G, 4G, 5G, LTE, GSM, etc.) and Bluetooth Mesh networks. In some other embodiments, system 121 communicates via one or more other radio telecommunications protocols other than or in addition to those already mentioned, such as, but not limited to, Z-Wave, ZigBee, Thread, Wi-Fi, straight Bluetooth Low Energy (BLE), classic Bluetooth, and so on.

Wireless device 122 is illustratively a smartphone with at least packet data capability provided and supported by the network in which it operates, namely data networking system 121, and that is configured to execute a software application (e.g., an "app") for installing one or more of the smart devices (e.g., lights, switches, sensors, etc.) in the design described above and in regard to device 102. In particular, the installer application enables the identification of mesh nodes, which are described below and in regard to FIG. 2, and the communication of their identities over a personal area network (e.g., Bluetooth®, etc.). The installer application also enables the distribution and application of design configuration, from server computer 112 to each mesh node. Wireless device 122 is described in detail below and in FIG. 3, and at least some of the operations performed by wireless device 122 described below and in FIG. 6.

In some embodiments of the present invention, device 122 is a different type of data-processing system, or executes an installer application that is different than a device-based app, or both. For example and without limitation, wireless device 122 can be referred to by a variety of alternative names such as, while not being limited to, a mobile station, a wireless transmit/receive unit (WTRU), a user equipment (UE), a wireless terminal, a cell phone, or a fixed or mobile subscriber unit. Wireless device 122 can be any other type of device (e.g., a tablet, etc.) that is capable of operating in a wireless network environment, mobility-oriented or otherwise.

In some embodiments of the present invention, device 122 comprises, or is itself, an Ethernet-to-Bluetooth gateway. In such embodiments, device 122 is wireless in the sense that it has and it uses a Bluetooth radio on one end of its gateway function, while the other end of the gateway function can interface to Ethernet cable (i.e., a wired interface).

Figure 2:
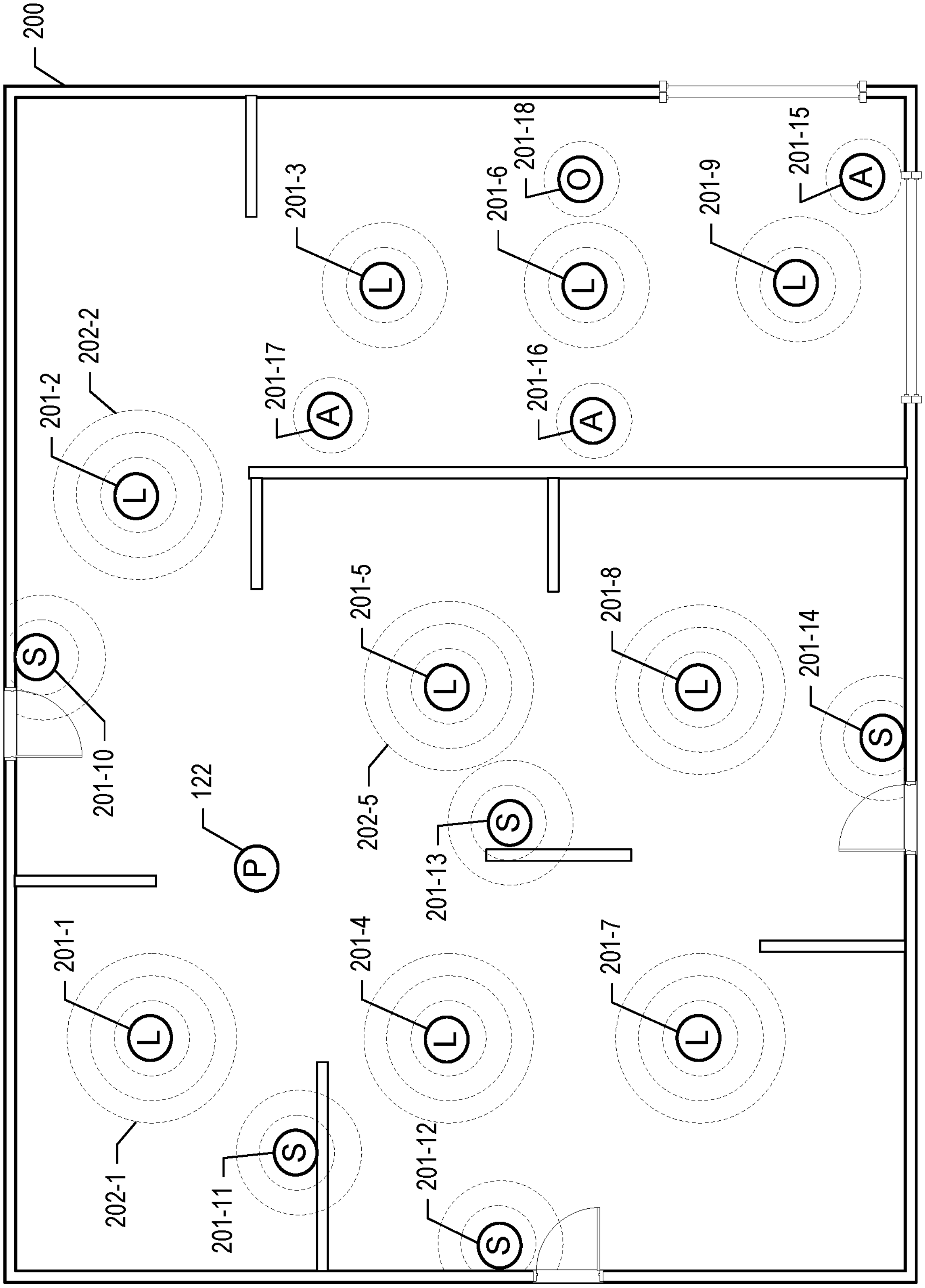
FIG. 2 depicts at least some of the nodes within mesh data network 131 in telecommunications system 100.

FIG. 2 depicts at least some of the nodes within mesh data network 131, in accordance with the illustrative embodiment. The depicted nodes are depicted according to how they are situated within building 200, according to a floor plan, such as one handled by the designer application described earlier. Building 200 is equipped with network nodes 201-1 through 201-M, wherein M is a positive integer (e.g., M equal to 18 as depicted, etc.). As depicted in FIG. 2, nodes 201-1 through 201-9 are light fixtures (or "luminaires" and denoted by "L"), nodes 201-10 through 201-14 are switches (denoted by "S"), nodes 201-15 through 201-17 are ambient light sensors (ALS, denoted by "A"), and node 201-18 is an occupancy sensor (denoted by "O"). The networked nodes communicate wirelessly with one another via transmitted signals 202-1, 202-2, and so forth. In some alternative embodiments of the present invention, however, one or more of the depicted elements can communicate via wired connections.

Mesh data network 131 enables communication between wireless device 122 and network nodes 201-1 through 201-M. To this end, the nodes within network 131 distribute data (e.g., the packet-based messages, etc.) in accordance with Bluetooth mesh networking. A "mesh network" is a network topology in which each node relays data for the network. The nodes that are involved cooperate in the distribution of data in the network. A mesh network can relay messages using either a flooding technique or a routing technique.

In some other embodiments, network 131 communicates via one or more other radio telecommunications protocols other than or in addition to Bluetooth mesh networking such as, but not limited to, Z-Wave, ZigBee, Thread, Wi-Fi, straight Bluetooth Low Energy (BLE), classic Bluetooth, and so on. Furthermore, as those who are skilled in the art will appreciate after reading this specification, wireless device 122 and at least some network nodes 201-1 through 201-M in some embodiments can be connected directly and non-wirelessly to one other, at least for some purposes and/or for some portion of time, such as through Universal Serial Bus (USB), FireWire™, or Thunderbolt™, for example and without limitation.

In accordance with the illustrative embodiment, nodes 201-1 through 201-M constitute an automation and control system—more specifically, a networked lighting system—in a commercial building, such as an office space or a retail space. As those who are skilled in the art will appreciate after reading this specification, however, the nodes can also be applied to a different type of building, such as a home, or to include the environment surrounding the building, or to any environment in which automated control can be applied.

Furthermore, building 200 can be a different type of structure with a roof and walls, or can instead be a defined area that comprises multiple sub-areas (e.g., open space, one or more conference rooms, one or more corridors, one or more closed offices, etc.). At least a portion of the area and/or sub-areas can be defined by something other than a roof and/or walls (e.g., a tent, an outdoor pavilion, a covered parking lot, a stadium or arena, etc.).

As those who are skilled in the art will appreciate after reading this specification, the luminaire nodes, as well as the nodes in general, can be positioned in any geometry or geometries with respect to one another, provided that each node is within communication range of one or more of the other nodes.

In accordance with the illustrative embodiment, some of nodes 201-1 through 201-M are luminaires comprising lamps that provide light to, and serve as light sources for, their environment within building 200; also, some of the nodes are switches and sensors for controlling the luminaires. As those who are skilled in the art will appreciate after reading this specification, however, at least some of the nodes can be devices that are other than luminaires, switches, and sensors. For example, one or more of the luminaires can be other types of nodes, such as sound systems or sprinklers, that provide a different type of output than light, such as sound or water.

Wireless device 122 is a wireless telecommunications terminal that is configured to transmit and/or receive communications wirelessly. It is an apparatus that comprises memory, processing components, telecommunication components, and user interface components (e.g., display, speaker, keyboard, microphone, etc.). Wireless device 122 comprises the hardware and software necessary to be compliant with the protocol standards used in the wireless networks in which it operates and to perform the processes described below and in the accompanying figures. For example and without limitation, wireless device 122 is capable of:

i. handling an incoming or outgoing telephone call or other communication (e.g., application-specific data, SMS text, email, media stream, etc.),
ii. provisioning one more devices into mesh network nodes 201-1 through 201-M, and
iv. installing one or more of network nodes 201-1 through 201-M, based on the configuration database maintained by server computer 112.

Wireless device 122 is described in detail below and in FIG. 3.

Each node 201-*m,* wherein m has a value between 1 and M, inclusive, is an apparatus that comprises memory, processing components, and communication components. Node 201-*m* is configured to transmit signals 202-*m* that convey control-related information, such as packet-based messages. Luminaire 201-*m,* for m=1 through 9, is also configured to provide light at an output that is based, at least in part, on the content of one or more messages received from one or more other nodes. Sensor node 201-*m,* for m=15 through 18, is also configured to sense one or more physical conditions (i.e., ambient light, occupancy) and can transmit messages based on the one or more physical conditions sensed. Node 201-*m* is described in detail below and in FIG. 4.

Figure 3:
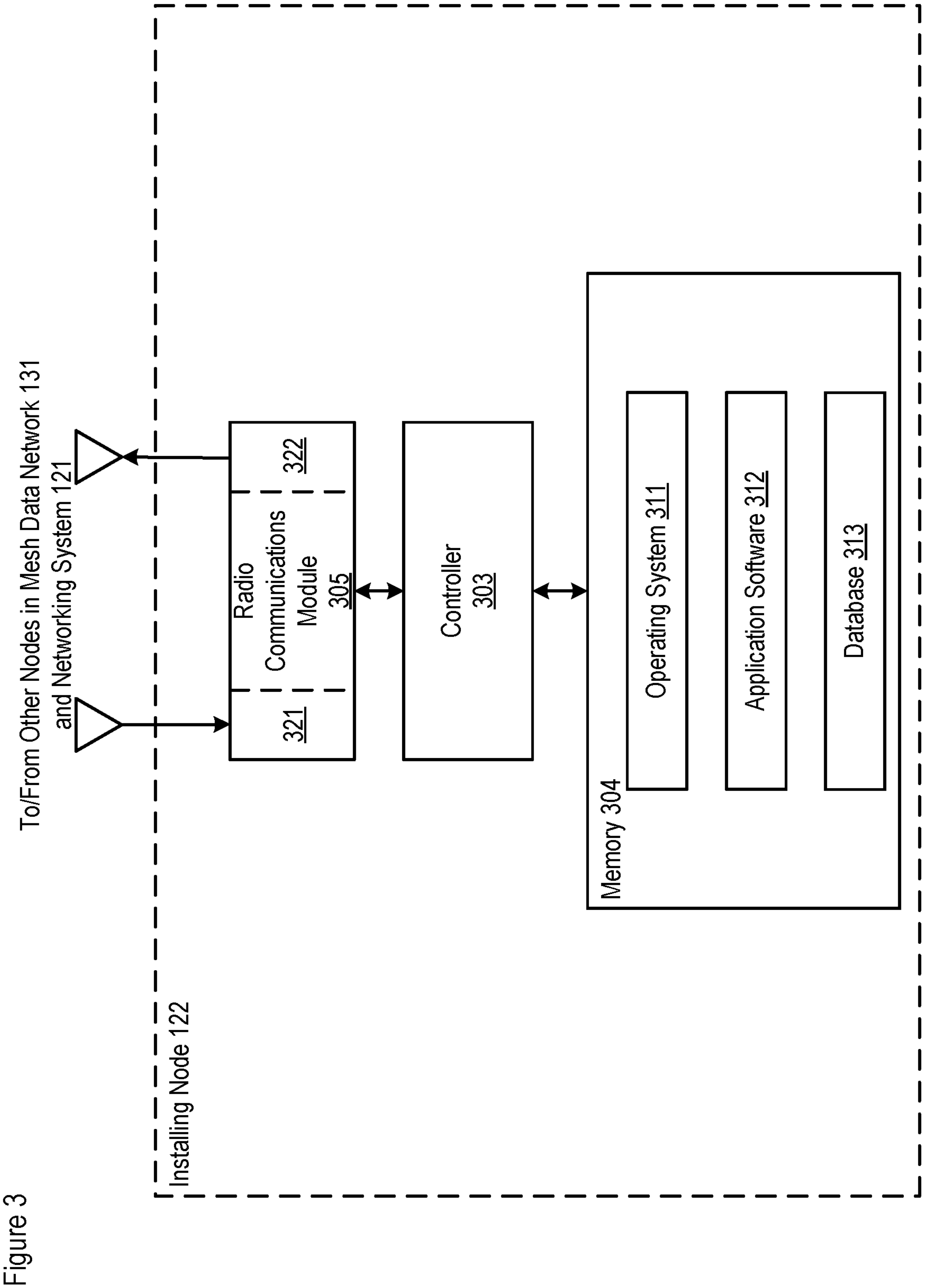
FIG. 3 depicts components of wireless device 122 according to the illustrative embodiment.

FIG. 3 depicts the salient components of wireless device 122 according to the illustrative embodiment. Wireless device 122 is also referred to as the "installing device." Wireless device 122 is based on a data-processing apparatus whose hardware platform comprises: controller 303, memory 304, and radio communications module 305, interconnected as shown.

Controller 303 is a processing device, such as a microcontroller or microprocessor with a controller interface, which are well known in the art. Controller 303 is configured such that, when operating in conjunction with the other components of wireless device 122, controller 303 executes software, processes data, and telecommunicates according to the operations described herein, including those depicted in FIG. 6.

Memory 304 is non-transitory and non-volatile computer storage memory technology that is well known in the art (e.g., flash memory, etc.). Memory 304 is configured to store operating system 311, application software 312, and database 313. The operating system is a collection of software that manages, in well-known fashion, wireless device 122's hardware resources and provides common services for computer programs, such as those that constitute the application software. The application software that is executed by controller 303 according to the illustrative embodiment enables wireless device 122 to perform the functions disclosed herein.

It will be clear to those having ordinary skill in the art how to make and use alternative embodiments that comprise more than one memory 304; or comprise subdivided segments of memory 304; or comprise a plurality of memory technologies that collectively store the operating system, application software, and database.

Radio communications module 305 is configured to enable wireless device 122 to telecommunicate with other devices, by receiving signals therefrom and/or transmitting signals thereto via receiver 321 and transmitter 322, respectively. In order to communicate with devices outside of mesh network 131, radio communications module 305 communicates in accordance with WiFi or other applicable standard. In order to communicate with other devices within mesh network 131, module 305 communicates in accordance with Bluetooth mesh networking. In some other embodiments, radio communications module 305 communicates via one or more other radio telecommunications protocols other than or in addition to WiFi and Bluetooth mesh networking, such as, but not limited to, a cellular network standard (e.g., LTE, GSM, etc.), Z-Wave, ZigBee, Thread, Wi-Fi, straight Bluetooth Low Energy (BLE), classic Bluetooth, and so on.

Receiver 321 is a component that enables wireless device 122 to telecommunicate with other components and systems by receiving signals that convey information therefrom. It will be clear to those having ordinary skill in the art how to make and use alternative embodiments that comprise more than one receiver 321.

Transmitter 322 is a component that enables wireless device 122 to telecommunicate with other components and systems by transmitting signals that convey information thereto. For example and without limitation, transmitter 322 is configured to transmit packets comprising the information described below and in FIGS. 6 through 8. It will be clear to those having ordinary skill in the art how to make and use alternative embodiments that comprise more than one transmitter 322.

In accordance with the illustrative embodiment, wireless device 122 uses radio communications module 305 in order to telecommunicate wirelessly with external devices. It will clear to those skilled in the art, however, after reading the present disclosure, how to make use and use various embodiments of the present invention in which wireless device 122 communicates via a wired protocol (e.g., X10, KNX, etc.) over physical media (e.g., cable, wire, etc.) with one or more external devices, either in addition to or instead of the wireless capability provided by radio communications module 305.

In generating and transmitting one or more packets that convey a message within mesh network 131, along with including its own network address as the source address in the message, wireless device 122 is said to originate the message. As described below, wireless device 122 is further capable of forwarding a message that has been originated by a different node.

Figure 4:
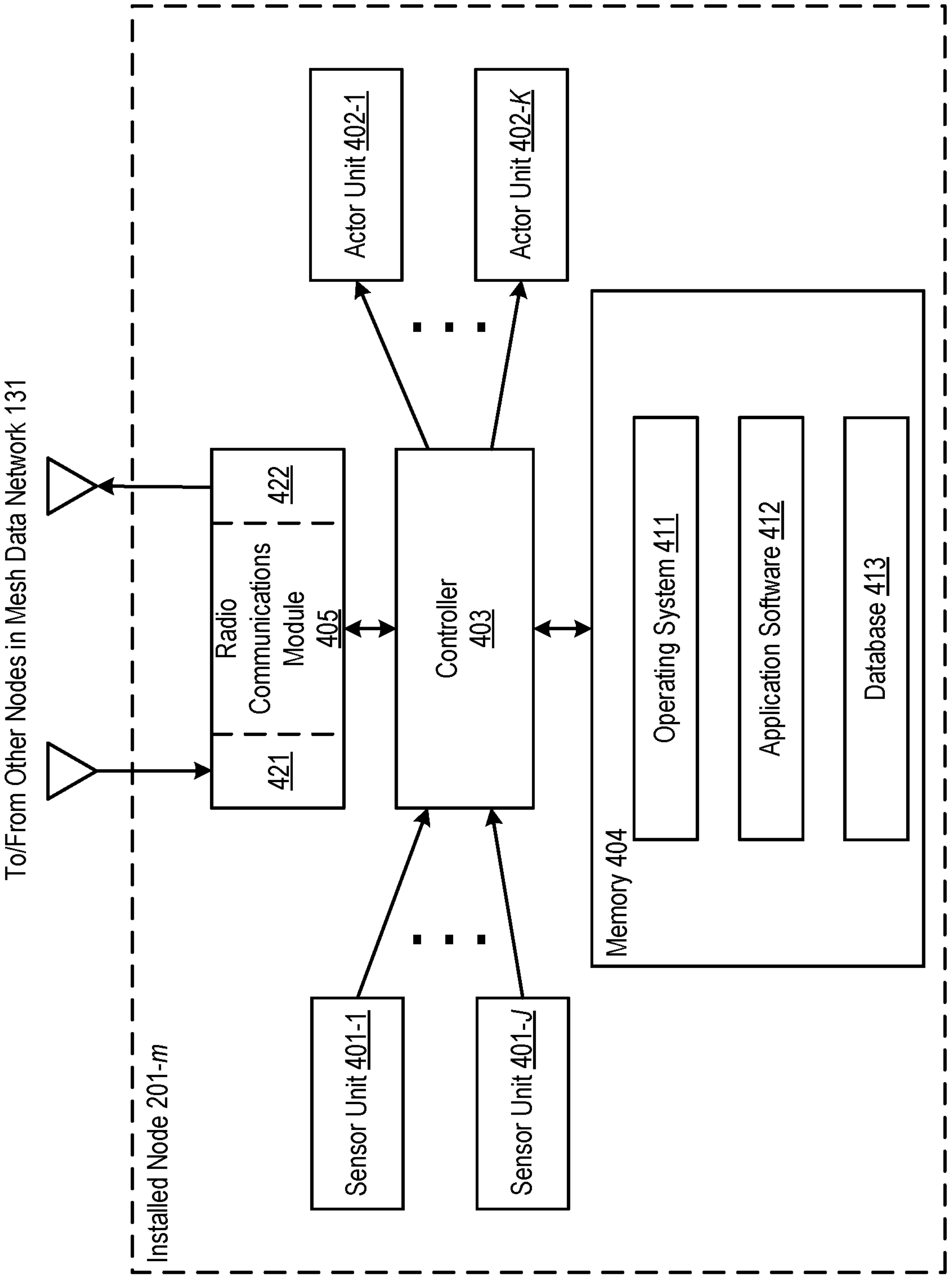
FIG. 4 depicts components of node 201-*m* according to the illustrative embodiment.

FIG. 4 depicts the salient components of node 201-*m* according to the illustrative embodiment. Node 201-*m* is also referred to as the "installed device." Node 201-*m* is based on a data-processing apparatus whose hardware platform comprises at least some of: sensor unit 401-1 through 401-J, wherein J is a positive integer, actor unit 402-1 through 402-K, wherein K is a positive integer, controller 403, memory 404, and radio communications module 405, interconnected as shown.

Various nodes within mesh network 131 can comprise different combinations of sensors, actors, controllers, memory, and communications modules. Each luminaire node 201-1 through 201-9, for example, includes a sensor unit (e.g., ambient light sensor, occupancy sensor, etc.), a controllable lamp (i.e., an actor unit), and a controller, although some luminaires might not include a sensor unit. Each switch node 201-10 through 201-15, for example, might or might not include a controller; those switches without a controller are stateless and send messages indicating a transition (i.e., "switch on", "switch off"). Furthermore, some sensors, for example, might be present that include a sensor unit and a controller, but not an actor unit (e.g., lamp, etc.). As those who are skilled in the art will appreciate after reading this specification, different configurations of mesh nodes are possible, wherein each node is based on one or more of the components that are described below.

Sensor unit 401-*j,* wherein j has a value between 1 and J, inclusive, is an apparatus that comprises memory, processing components, and communication components, and is configured to gather information about the environment that is accessible by the sensor unit. Each sensor is configured to monitor a particular physical condition in well-known fashion (e.g., temperature, ambient light, humidity, occupancy, etc.). For example, nodes 201-15 through 201-17 comprise an ambient light sensor and node 201-18 comprises an occupancy sensor.

Each sensor unit is configured to report a state of the condition by providing input signals to controller 403, wherein the values of the input signals are representative of the states being reported. A given sensor unit 401-*j* can report discrete input signal values and/or a continuum of states and can report states at particular times and/or continuously. A change in state, which is determined by controller 403 as described below, can occur based one or more sensor units detecting changes in the following, in any combination:

i. environmental probes (e.g., temperature, ambient light, motion, infrared signature, humidity, etc.).
ii. electrical inputs (i.e., binary, analog, bus), including from a switch.
iii. signals received via radio (e.g., proximity beacons, etc.).
iv. a state of the internal logic, woken up periodically based on time or on an external event.

For example and without limitation, a state change can correspond to a switch being actuated, occupancy being detected, a timer or counter reaching a predefined value, and so on.

Actor unit 402-*k*, wherein k has a value between 1 and K, inclusive, is an apparatus that comprises memory, processing components, and communication components, and is capable of doing something in the course of being affected by signals originating externally to the actor component, such as from controller 403, as described in detail below. Each actor unit acts upon its environment in well-known fashion.

Actor unit 402-*k* is configured to receive, transmit, process, and/or relay signals conveying data, as well as being configured to affect a condition, physical or otherwise, in its environment, for example by generating a control signal. In accordance with the illustrative embodiment, actor unit 402-1 of each node 201-1 through 201-9 is a lamp whose output is modifiable by controller logic executed by controller 403.

As those who are skilled in the art will appreciate after reading this disclosure, actor unit 402-*k* can provide a different function than controlling a lamp to give light according to a configurable light output. For example and without limitation, the condition being affected can be:

i. lighting, which can be adjusted (e.g., turning on or off, changing light output, changing brightness, changing color or mood, changing illuminance, displaying a picture or pattern, etc.).
ii. sound, which can be adjusted (e.g., increasing or decreasing volume, changing playlist or mood, turning on/off, selecting signal source, etc.).
iii. room climate, which can be controlled (e.g., increasing or decreasing temperature, humidity, air fragrance, fan speed, etc.).
iv. an alert, which can be generated (e.g., of an email, of an SMS message, etc.).
v. monitoring by a camera, which can be panned or tilted.
vi. office meeting/presentation settings (e.g., selecting one or more of signal source, streaming application, multimedia to play, audio language, subtitles, chapter, play/pause/stop, rewind/fast forward, etc.).
vii. connected/smart video monitor features (e.g., selecting application to be launched, navigating through on-screen menus, etc.).
viii. virtual keyboard—navigation on virtual keyboard displayed by other device (e.g., video monitor, set-top box, etc.).
ix. control of shades/window coverings/blinds.
x. access control (e.g., unlocking/locking doors, opening/shutting doors, authorizing access to selected rooms or zones, etc.).

Furthermore, node 201-*m* can comprise any combination of and any number of actor functions. As those who are skilled in the art will appreciate, after reading this disclosure, node 201-*m* that comprises one or more actor functions can be in a variety of forms, such as a luminaire in a lighting system, a media player as part of an audio/video system, a heater and/or ceiling fan as part of an environment control system, an outgoing-email server as part of a messaging system, an actor in a water sprinkler system, a pump, a robot or robotic arm, a pan/tilt camera, a switch, a motor, a servo mechanism, and so on.

Controller 403 is a processing device, such as a microcontroller or microprocessor with a controller interface, which are well known in the art. Controller 403 is configured such that, when operating in conjunction with the other components of node 201-*m*, controller 403 executes software, processes data, and telecommunicates according to the operations described herein, including those depicted in FIG. 10.

Memory 404 is non-transitory and non-volatile computer storage memory technology that is well known in the art (e.g., flash memory, etc.). Memory 404 is configured to store operating system 411, application software 412, and database 413. The operating system is a collection of software that manages, in well-known fashion, node 201-*m*'s hardware resources and provides common services for computer programs, such as those that constitute the application software. The application software that is executed by controller 403 according to the illustrative embodiment enables node 201-*m* to perform the functions disclosed herein.

It will be clear to those having ordinary skill in the art how to make and use alternative embodiments that comprise more than one memory 404; or comprise subdivided segments of memory 404; or comprise a plurality of memory technologies that collectively store the operating system, application software, and database.

Radio communications module 405 is configured to enable node 201-*m* to telecommunicate with other devices and systems, including other mesh network nodes, by receiving signals therefrom and/or transmitting signals thereto via receiver 421 and transmitter 422, respectively. Radio communications module 405 communicates in accordance with Bluetooth mesh networking. In some other embodiments, radio communications module 405 communicates via one or more other radio telecommunications protocols other than or in addition to Bluetooth mesh networking such as, but not limited to, Z-Wave, ZigBee, Thread, Wi-Fi, straight Bluetooth Low Energy (BLE), classic Bluetooth, and so on.

Receiver 421 is a component that enables node 201-*m* to telecommunicate with other components and systems by receiving signals that convey information therefrom. It will be clear to those having ordinary skill in the art how to make and use alternative embodiments that comprise more than one receiver 421.

Transmitter 422 is a component that enables node 201-*m* to telecommunicate with other components and systems by transmitting signals that convey information thereto. For example and without limitation, transmitter 422 is configured to transmit packets comprising the information described below and in FIGS. 6 through 10. It will be clear to those having ordinary skill in the art how to make and use alternative embodiments that comprise more than one transmitter 422.

In accordance with the illustrative embodiment, node 201-*m* uses radio communications module 405 in order to telecommunicate wirelessly with external devices. It will clear to those skilled in the art, however, after reading the present disclosure, how to make use and use various embodiments of the present invention in which node 201-*m* communicates via a wired protocol (e.g., X10, KNX, etc.) over physical media (e.g., cable, wire, etc.) with one or more external devices, either in addition to or instead of the wireless capability provided by radio communications module 405.

In generating and transmitting one or more packets that convey a message within mesh network 131, along with including its own network address as the source address in the message, node 201-*m* is said to originate the message. As described below, node 201-*m* is further capable of forwarding a message that has been originated by a different node.

Figure 5:
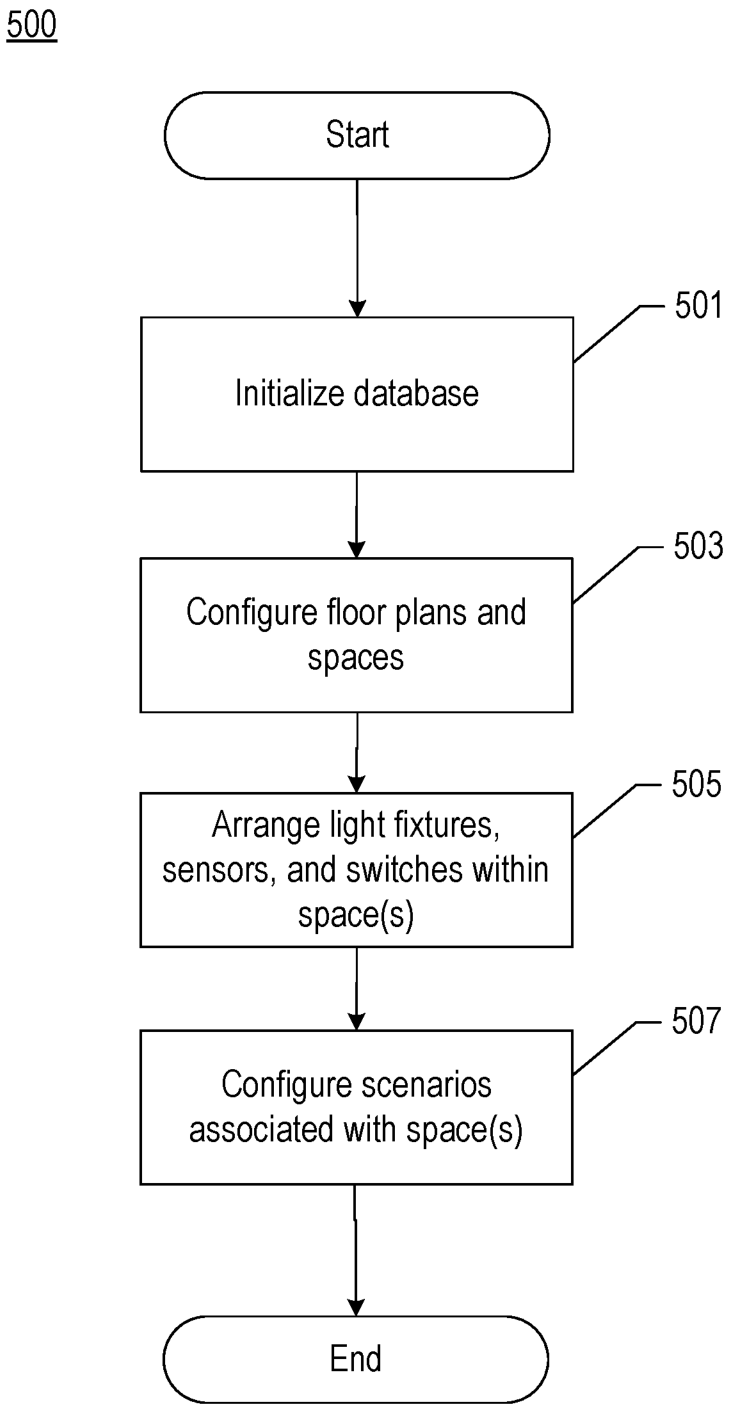
FIG. 5 depicts operations of method 500 according to the illustrative embodiment, by which browser device 102 performs various functions that are related to designing an automation and control system for building 200.

Operations of Browser Device 102 in Designing a Building Automation and Control System: FIG. 5 depicts salient operations of method 500 according to the illustrative embodiment, by which browser device 102 performs various functions that are related to designing an automation and control system for building 200.

In regard to method 500, as well as to the other methods depicted in the flowcharts and message flow diagrams contained herein, it will be clear to those having ordinary skill in the art, after reading the present disclosure, how to make and use alternative embodiments of the disclosed methods in which the recited operations, sub-operations, and messages are differently sequenced, grouped, or sub-divided—all within the scope of the present invention. It will be further clear to those skilled in the art, after reading the present disclosure, how to make and use alternative embodiments of the disclosed methods wherein some of the described operations, sub-operations, and messages are optional, are omitted, or are performed by other elements and/or systems than the illustrative devices associated with the respective methods.

In accordance with the illustrative embodiment, browser device 102 is featured here as performing the operations associated with method 500. As those who are skilled in the art will appreciate after reading this specification, in some alternative embodiments a different device (e.g., wireless device 122, etc.) performs method 500.

In accordance with operation 501, and based on user input into the designer application, browser device 102 generates and transmits signals to initialize the building configuration database maintained by server computer 112. In some embodiments, an account and a project are first created within which to organize design information.

In accordance with operation 503, and based on user input into the designer application, browser device 102 generates and transmits signals to configure a floor plan and to define one or more design "spaces" within the floor plan. In some embodiments, a ceiling (with lights and sensors) as reflected when looking down on a floor is displayed through the browser app to the user, and is used by the user as a canvas for planning and configuring a lighting and sensor system. The user is able to identify the spaces in relation to the floor plan, and device 102 generates and transmits signals corresponding to the user's actions. In some embodiments of the present invention, at some of the spaces overlap with one or more of the other spaces.

In accordance with operation 505, and based on user input into the designer application, browser device 102 generates and transmits signals to arrange the placement of light fixtures, sensors, and switches, in relation to the one or more spaces identified in operation 503. As a result, a relationship is established in the database between each defined space and the placement (virtual representation) of a plurality of devices within the space on the floorplan. At this point, the database does not necessarily possess, nor does it require, knowledge of the actual devices that are or will be installed at the placements identified and arranged in accordance with operation 505.

In accordance with operation 507, and based on user input into the designer application, browser device 102 generates and transmits signals to configure one or more scenarios to be assigned to each space defined in operation 503. The following are scenarios that can be associated with each space, for example and without limitation:

i. a "switch" (or "manual on/manual off") scenario. A light (without a controller) responds to a switch that transmits an "on" or "off" notification, as part of a scenario comprising these switch-related functions.

ii. an "occupancy" (or "automatic on/automatic off") scenario. One or more lights (with controllers) respond to an occupancy sensor or sensors that transmit an "on" notification and, later, automatically turn themselves off based on the occupancy sensors not having detected occupancy for a predetermined length of time, as part of this scenario comprising these occupancy-related functions.

iii. a "vacancy" (or "manual on/automatic off") scenario. One or more lights (with controllers) respond to a switch or switches that transmit an "on" notification and, later, automatically turn themselves off based on occupancy sensors not having detected occupancy for a predetermined length of time, as part of a scenario comprising these vacancy-related functions.

iv. a "scenes" scenario. Scenes are memorized lighting level presets (e.g., for audio-visual presentation, after-hours cleaning of office spaces, etc.)

Additionally, a "daylight harvesting" option can be configured to augment the aforementioned switch, occupancy, and vacancy scenarios, in which an ambient light sensing function is utilized to adjust the light output of the fixtures, once the yet-to-be commissioned devices are operating as part of a mesh network.

As a result of associating one or more scenarios with one or more of the defined spaces in the database, a relationship is established in the database between each space and one or more scenarios assigned to the space.

Operations for Installing the Nodes in the Designed Automation and Control System: FIG. 6 depicts salient operations of method 600 according to the commissioning system of the illustrative embodiment, the commissioning system comprising data-processing system 111 and wireless device 122, by which various functions are performed related to installing nodes 201-1 through 201-M in mesh network 131. For at least some of the operations described below, the commissioning system generates and transmits the appropriate signals that implement the described operations, based on user input into an installer software application (or "app") executing on device 122.

In accordance with the illustrative embodiment, data-processing system 111 is featured here as performing the operations associated with method 600, wherein wireless device 122 serves in part as an intermediary device, in that it relays messages between system 111 and one or more mesh nodes in network 131. As those who are skilled in the art will appreciate after reading this specification, in some alternative embodiments a different device performs method 600. For example, in some embodiments of the present invention, wireless device 122 can perform at least some of the operations associated with method 600.

In accordance with operation 601, data-processing system 111 retrieves configuration data stored in a database in a memory within system 111. The database, including configuration data, was previously created as part of the design process described above and with regard to FIG. 5. The received configuration data identifies the placement of each of a plurality of devices in relation to each space defined in the database, including a first space and a second space. The received configuration data also identifies one or more scenarios (e.g., a first scenario, a second scenario, etc.) assigned to each space. With this information, it can be inferred that devices at certain placements will be subject to certain scenarios. In some alternative embodiments, wireless device 122 receives the configuration data from data-processing system 111.

In accordance with operation 603, data-processing system 111 provisions one or more network-capable devices that it is capable of communicating with via wireless device 122, in order to form a mesh network. Prior to this point, network addresses have not yet been provided to the network-capable devices; consequently, the network-capable devices are not yet in communication with one another. It is through this process that a network-capable device becomes a node in the mesh network, capable of communicating with other nodes in the mesh network and, of particular significance, capable of transferring some of the information described below, such as group addresses and other operational parameters.

Wireless device 122 is capable of communicating with the one or more network-capable devices when it is within communication range of the devices. Accordingly, device 122 can serve as an intermediary in provisioning the devices, while under the control of a user (e.g., technician, etc.) when the user and device 122 are on-site and within range of the devices (e.g., in the same room, on the same building floor, etc.).

Within a Bluetooth® context, the provisioning of the network-capable devices is described in the Bluetooth Mesh Profile Specification, Revision v1.0, dated Jul. 13, 2017 (the "Mesh Profile Specification"), which is incorporated herein by reference. In general, provisioning includes data-processing system 111 assigning and providing, via wireless device 122 to each network-capable device, a unique unicast address, along with a network key. The unicast address is transmitted in such a way that the recipient node is configured to regard the address as one that uniquely identifies the node in the data network. In some alternative embodiments of the present invention, wireless device 122 performs additional operations (e.g., assigning, etc.) instead of relaying messages between data-processing system 111 and the network-capable devices. In some other embodiments of the present invention, one or more of the unicast addresses have been preassigned.

In some embodiments of the present invention, the functionality of each network node can be discovered over the mesh network by reading composition data that is transmitted amongst the network nodes. Composition data is defined in the Mesh Profile Specification. The functionality is determined by the model or models that the node supports, which are also defined in the aforementioned Specification.

In accordance with operation 605, data-processing system 111 receives, from wireless device 122, information that maps each mesh node to its virtual representation (i.e., its placement as described earlier) on the floor plan in the configuration data received in accordance with operation 601. The commissioning system maps each node in a subset (e.g., proper subset, improper subset, etc.) of the provisioned first set of nodes to each respective node in a second set of nodes in mesh network 131, wherein the second set of nodes corresponds to at least some of the plurality of devices whose placements are represented in the database. At this point, not only the placements of a plurality of devices are known to be associated with a particular space or spaces, but the provisioned network nodes are also known to be associated with the space or spaces as well.

Mapping can involve one or more techniques such as, while not being limited to, utilizing one or more of i) received signal strength indication (RSSI) measurements, ii) Time of Flight (TOF) measurements, iii) other types of sensor readings, and so on. In accordance with the illustrative embodiment, the installation app executing on wireless device 122 receives signals from its user interface the indicate a selection of which identified mesh network node matches a device whose placement is represented on a floorplan in the configuration database.

In some embodiments, mesh network 131 had been previously provisioned and the mesh nodes have had their unicast addresses and network keys already assigned. In such embodiments, the identification and mapping process associated with operation 605 additionally involves learning each mesh node's previously-assigned unicast address and then mapping the identified node to its virtual representation as described above.

In accordance with operation 607, data-processing system 111 takes the scenarios and spaces, as representing a logical configuration, and transforms them into a network-centric configuration. Operation 607 is described in detail and in regard to FIG. 7.

In accordance with operation 609, data-processing system 111 applies the relevant configuration to each mesh node in accordance with the protocol standard of the mesh network (e.g., Bluetooth®, etc.). In this operation, system 111 takes the network-centric configuration, obtained in accordance with operation 607, and decomposes it into a physical configuration of each mesh node, resulting in a set of parameters for each mesh node, which system 111 then provides, via wireless device 122, to the applicable mesh node or nodes. Operation 609 is described in detail and in regard to FIG. 8. Also, an example of a mesh node commissioning process, including transformation- and decomposition-related operations from FIGS. 7 and 8, respectively, is described below and in regard to FIG. 9.

Additionally, the commissioning system can fine tune one or more parameters that have been generated for the mesh nodes as part of operation 609. For example, based on user input into the installer app, one or both of data-processing system 111 and wireless device 122 can update the reflected light level as measured by one or more sensor-equipped mesh nodes.

Operations in Transforming Scenarios and Spaces: FIG. 7 depicts salient sub-operations within operation 607, by which data-processing system 111 transforms the scenarios and spaces, which represent essentially a logical configuration of building 200's automation and control system, into a network-centric configuration.

In accordance with operation 701, data-processing system 111 generates group addresses. A "group address" is defined in the Bluetooth Mesh Profile Specification, Section 3.4.2.4. Data-processing system 111 generates a group address based on one or more of i) the particular space with which the second set of nodes (in mesh network 131) is associated, as established by mapping operation 605, and/or ii) the functions that are performed by the second set of nodes in performing a particular scenario assigned to the particular space.

The act itself of generating the group address can be based on the space and/or functions performed, or the value of the group address (e.g., denoting a Fixed Group address, denoting other usage, etc.) can be based on the space and/or functions performed, or both. For example, data-processing system 111 can generate a first group address that is dependent on a first space and functions performed in conjunction with a first scenario assigned to the first space, or system 111 can generate a second group address that is dependent on a first space and functions performed in conjunction with a second scenario assigned to the first space, or system 111 can generate a third group address that is dependent on a second space and functions performed in conjunction with a scenario assigned to the second space.

Group addresses are what at least some nodes (e.g., sensors, etc.) publish to, once mesh network 131 becomes operational. Consequently, a first group address might be created for a first sensor to publish to in a first space, a second group address might be created for a second sensor to publish to in a second space (or in the first space, for that matter), and so on.

In accordance with operation 703, data-processing system 111 assigns nodes to one or more groups that correspond to the group addresses generated in accordance with operation 701. Data-processing system 111 assigned a node to a group address based on one or more of i) the particular space with which the node is associated, as established by mapping operation 605, and/or ii) the functions that are performed by the node in performing a particular scenario assigned to the particular space. The assignment a node to a group or groups reflects to which group(s) the node is subscribed.

Control of operation execution then proceeds to operation 609.

Operations in Generating Parameters for Each Mesh Node: FIG. 8 depicts salient sub-operations within operation 609, by which data-processing system 111 takes the network-centric configuration obtained in accordance with operation 607 and decomposes it into a physical configuration of each mesh node, resulting in a set of parameters for each mesh node In accordance with operation 801, data-processing system 111 determines a set of parameters for each mesh node 201-*m* in the mesh network 131, based on i) the nodes that have been assigned to each group, in accordance with operation 703, and/or ii) the function or functions to be performed by each mesh node 201-*m*. There are various types of parameters, as will now be described.

Data-processing system 111 can determine parameters that are related to publications and subscriptions, including those related to groups that a mesh node publishes to and/or groups that a mesh node is subscribed to. The concept of "publish-subscribe" is described in Mesh Profile Specification, Section 2.3.8.

Data-processing system 111 can determine parameters that are related to security, including application groups and subnets. The concept of "security" is described in Mesh Profile Specification, Section 2.3.9.

Data-processing system 111 can determine additional parameters for each model. In a Bluetooth® context, the detailed set of parameters are generally described in various sections of the Mesh Profile Specification, cited earlier in this disclosure, and the Bluetooth Mesh Model Specification, Revision v1.0, dated Jul. 13, 2017 (the "Mesh Model Specification"), which is incorporated herein by reference. Some of the parameters are as follows:

i. Network layer parameters (e.g., retransmissions, TTL values, relays, proxies, etc.),
ii. Dimming ranges and defaults for light fixtures,
iii. Levels and timings for light controllers,
iv. Ranges and reporting cadence for sensors,
v. Scenes,
vi. Time value and propagation, and
vii. Schedulers.

In accordance with operation 803, data-processing system 111 directs wireless device 122 to transmit, in one or more messages, the assigned group address (e.g., first group address, second group address, etc.) and other parameters determined in accordance with operation 801 to the applicable node as identified (and addressed) by its unicast address. Device 122 transmits these messages in accordance with the mesh network protocol. For each node being commissioned in the second set of nodes in mesh network 131, device 122 transmits the node-specific set of parameters. Device 122 transmits the assigned group addresses in such a way that each mesh node stores its group address and, going forward, each subscribing node is responsive to one or more received messages that contain, in the destination address field of the received message, the stored group address.

Figure 9:
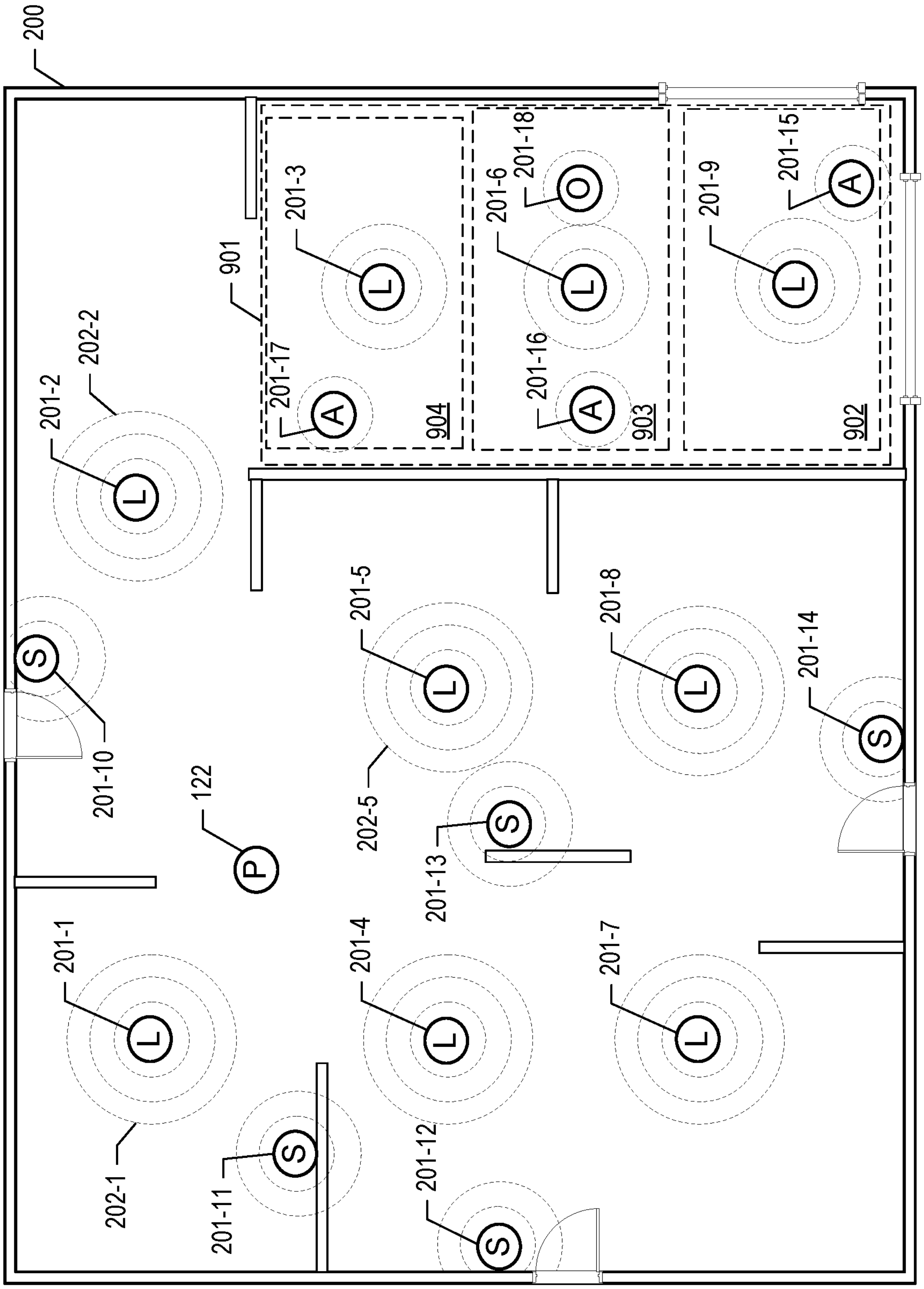
FIG. 9 depicts at least some of the nodes within mesh data network 131, which participate in a mesh node commissioning process in accordance with the illustrative embodiment.

Example of a Mesh Node Commissioning Process: FIG. 9 depicts at least some of the nodes within mesh data network 131, which participate in a mesh node commissioning process in accordance with the illustrative embodiment and described below. In the example, a conference room within building 200 is equipped with luminaires 201-3, 201-6, and 201-9; the conference room is also equipped with ambient light sensors 201-15 through 201-17 and occupancy sensor 201-18. A scenario of occupancy processing with daylight harvesting is to be applied to the conference room and, more specifically, to the network-capable luminaires and sensors.

A first aspect of the commissioning process involves transformation, as described above and in FIG. 7, in which the "conference room" space and the "occupancy with daylight harvesting" scenario is to be transformed into a network-centric configuration. The abstract concept of "spaces" and "scenarios" has to be transformed into a real network of nodes with necessary functions: in this case, the luminaires and sensors identified above.

As the conference room is a smaller part of building 200, it is necessary to generate group addresses that sensors 201-15 through 201-18 will be publishing to. In the example, and in accordance with operation 701, data-processing system 111 generates a first group address for the occupancy function and a second group address for the ambient-light-sensing (ALS) function. Occupancy group 901 will be for the whole conference room. Ambient light sensing will use three separate sensors for three zones: sensor 201-15 near the windows, sensor 201-16 in the middle, and sensor 201-17 far from the window.

In accordance with operation 703, data-processing system 111 assigns luminaires 201-3, 201-6, and 201-9 to the groups. In the example, each luminaire will be a member of two groups: occupancy group 901 and one of the ALS groups. In particular, luminaire 201-9 belongs to ALS group 902, luminaire 201-6 belongs to ALS group 903, and luminaire 201-3 belongs to ALS group 904. Conveniently, the areas defined by elements 901 through 904 as drawn coincide with the spaces that have been defined by the user in designing the conference room lighting control, although this is not always the case.

A second aspect of the commissioning process involves decomposition, as described above and in FIG. 8. Data-processing system 111 decomposes the network-centric configuration into a set of parameters for each node that system 111 generates in accordance with operation 801, such as the group that a node publishes to, the group or groups that a node is subscribed to, the publishing cadence, the application security keys that are used, and so on. There are also parameters defining the node's behavior from the network perspective, such as whether the node is a relay or not, the number of times that a relay node retransmits, whether the node is a proxy node that allows smartphones connecting to the network, and so on. In accordance with operation 803, system 111 provides, via wireless device 122 acting as a relay, each set of parameters generated to the applicable node—in this case, luminaires 201-3, 201-6, and 201-9 and sensors 201-15 through 201-18.

Figure 10:
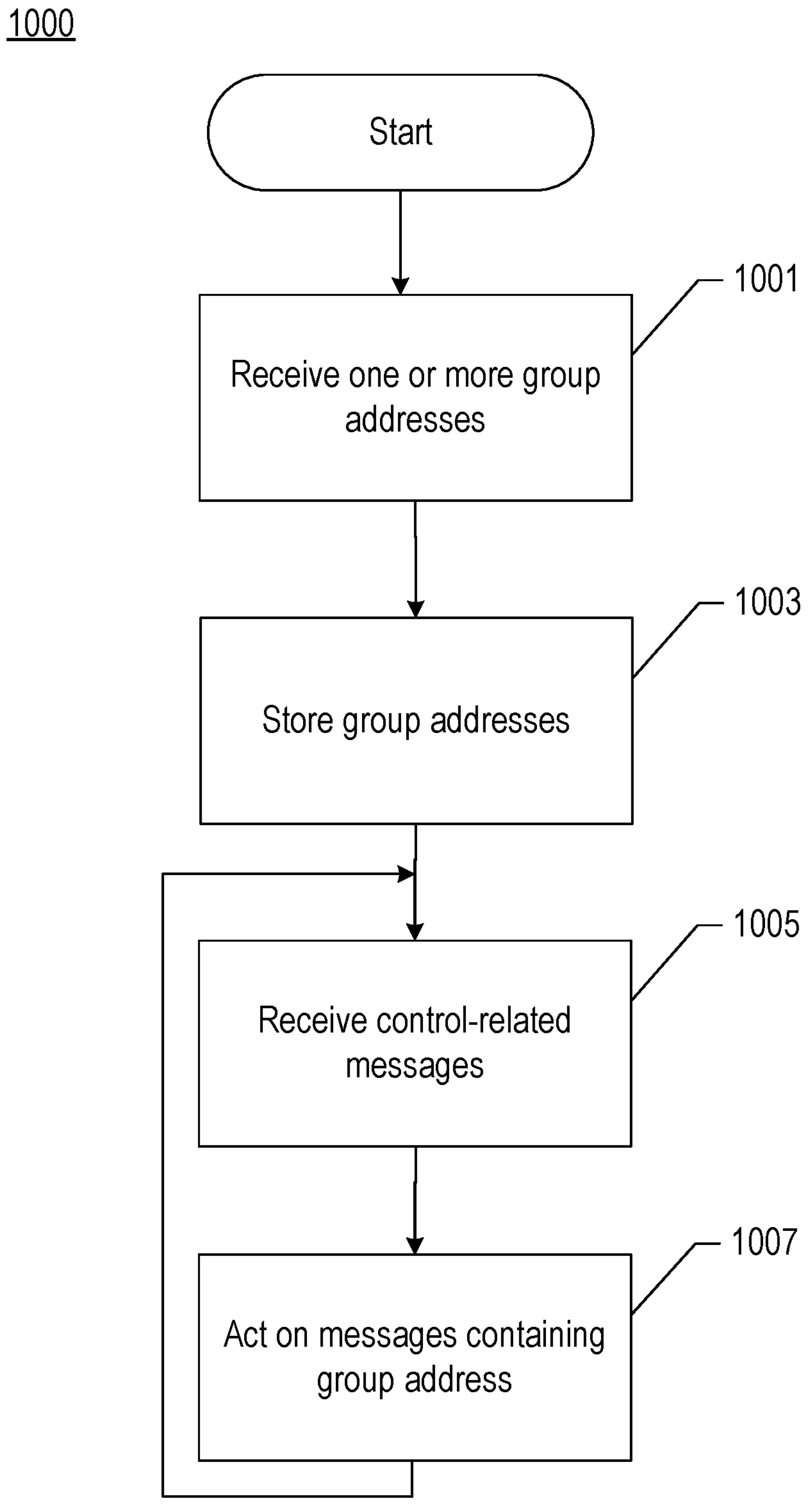
FIG. 10 depicts operations of method 1000 according to the illustrative embodiment, by which each mesh node 201-*m* performs various functions related to interacting with other nodes in network 131.

Operations of Mesh Node 201-*m* while Interacting with Other Mesh Nodes: FIG. 10 depicts salient operations of method 1000 according to the illustrative embodiment, by which each mesh node 201-*m* performs various functions related to interacting with other nodes in network 131.

In accordance with the illustrative embodiment, luminaire 201-3 is featured here as performing the operations associated with method 1000. As those who are skilled in the art will appreciate after reading this specification, other mesh nodes are capable of performing method 600 concurrently with luminaire 201-3 and with one another.

In accordance with operation 1001, luminaire 201-3 receives one or more group addresses and other parameters that are transmitted by wireless device 122 in accordance with operation 803. For example, luminaire 201-3 might receive group addresses corresponding to groups 901 and 904, to which luminaire 201-3 is subscribed as described above and in FIG. 9.

In accordance with operation 1003, luminaire 201-3 stores the one or more group addresses and other parameters that are received in accordance with operation 1001.

In accordance with operation 1005, and after entering a monitoring mode, luminaire 201-3 receives a control-related message from another mesh node. The message might originate from ambient light sensor 201-17 and contain a group address for group 904, or from occupancy sensor 201-18 and contain a group address for group 901.

In accordance with operation 1007, luminaire 201-3 acts on the message received in accordance with operation 1005, only if the destination address in the received message is the stored group address—in this case, the addresses for groups 901 and 904. For example, luminaire 201-3 might turn on its lamp or adjust its light output, based on the message containing a subscribed-to group address.

Luminaire 201-3 continues to monitor for additional control-related messages and, if appropriate, to act on them (e.g., turn on lamp, turn off lamp, dim lamp, etc.).

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method for commissioning nodes in a mesh network, the method comprising:

generating, by a data-processing system, a first set of signals to configure a floor plan of a building and to define one or more spaces in relation to the floor plan, including a first space within the building, based on a first user input;

generating, by the data-processing system, a second set of signals to configure one or more scenarios to be assigned to each of the one or more spaces, including a first scenario assigned to the first space, based on a second user input;

transmitting, to a database, the first set of signals and the second set of signals;

retrieving configuration data from the database, wherein the configuration data represents (i) a placement of each device in a first set of placed devices in relation to the first space and (ii) the first scenario assigned to the first space;

generating a first group address that is based on (i) the first space and (ii) predetermined functions to be performed by the first set of placed devices, when provisioned in the mesh network as a first set of provisioned nodes, in performing the first scenario assigned to the first space;

mapping, by an installing device, a first provisioned node in the first set of provisioned nodes to a first placed device in the first set of placed devices, wherein the mapping is based, at least in part, on the installing device receiving a selection of the first provisioned node as matching a device within the first space; and transmitting, by the installing device, the first group address to the first provisioned node as identified by a unicast address of the first provisioned node, wherein the first group address is transmitted such that the first provisioned node is configured to be responsive, in accordance with the predetermined functions, to one or more subsequently-received messages containing the first group address in a destination address field of the one or more subsequently-received messages.

2. The method of claim 1, further comprising:

mapping, by the installing device, a second provisioned node in the first set of provisioned nodes to a second placed device in the first set of placed devices; and transmitting, by the installing device, the first group address to the second provisioned node as identified by a unicast address of the second provisioned node, wherein the first group address is transmitted such that the second provisioned node is configured to be responsive, in accordance with the predetermined functions, to the one or more subsequently-received messages containing the first group address in the destination address field of the one or more subsequently- received messages.

3. The method of claim 1 wherein the first scenario comprises an occupancy-related function, and wherein the first group address is based on the first scenario comprising the occupancy-related function.

4. The method of claim 1, further comprising transmitting, by the installing device, one or more messages to the first provisioned node, as identified by the unicast address of the first provisioned node, wherein the one or more messages act to configure a first parameter that configures a functionality of the first provisioned node, and wherein the one or more messages are based on the predetermined functions.

5. The method of claim 4 wherein the first parameter relates to a dimming range, wherein the first provisioned node comprises a light fixture.

6. The method of claim 4 wherein the first parameter relates to a reporting cadence, wherein the first provisioned node comprises a sensor.

7. The method of claim 1, further comprising provisioning, by the installing device, a first set of unprovisioned devices with a first set of respective unicast network addresses, resulting in the first set of provisioned nodes.

8. The method of claim 1, wherein the selection of the first provisioned node is from a user of the installing device.

9. The method of claim 1, wherein the installing device is configured to relay messages within the mesh network.

10. A system for commissioning nodes in a mesh network, the system comprising:

a data-processing system configured to:

(a) generate a first set of signals to configure a floor plan of a building and to define one or more spaces in relation to the floor plan, including a first space within the building, based on a first user input, (b) generate a second set of signals to configure one or more scenarios to be assigned to each of the one or more spaces, including a first scenario assigned to the first space, based on a second user input, (c) transmit, to a database, the first set of signals and the second set of signals, (d) retrieve configuration data from the database, wherein the configuration data represents (i) a placement of each device in a first set of placed devices in relation to the first space and (ii) the first scenario assigned to the first space, and (e) generate a first group address that is based on (i) the first space and (ii) predetermined functions to be performed by the first set of placed devices, when provisioned in the mesh network as a first set of provisioned nodes, in performing the first scenario assigned to the first space; and an installing device configured to:

(a) map a first provisioned node in the first set of provisioned nodes to a first placed device in the first set of placed devices, wherein the mapping is based, at least in part, on the installing device receiving a selection of the first provisioned node as matching a device within the first space, and (b) transmit the first group address to the first provisioned node as identified by a unicast address of the first provisioned node, wherein the first group address is transmitted such that the first provisioned node is configured to be responsive, in accordance with the predetermined functions, to one or more subsequently-received messages containing the first group address in a destination address field of the one or more subsequently-received messages.

11. The system of claim 10, wherein the installing device is further configured to:

map a second provisioned node in the first set of provisioned nodes to a second placed device in the first set of placed devices; and transmit the first group address to the second provisioned node as identified by a unicast address of the second provisioned node, wherein the first group address is transmitted such that the second provisioned node is configured to be responsive, in accordance with the predetermined functions, to the one or more subsequently-received messages containing the first group address in the destination address field of the one or more subsequently-received messages.

12. The system of claim 10 wherein the first scenario comprises an occupancy-related function, and wherein the first group address is based on the first scenario comprising the occupancy-related function.

13. The system of claim 10, wherein the installing device is further configured to transmit one or more messages to the first provisioned node, as identified by the unicast address of the first provisioned node, wherein the one or more messages act to configure a first parameter that configures a functionality of the first provisioned node, and wherein the one or more messages are based on the predetermined functions.

14. The system of claim 13 wherein the first parameter relates to a dimming range, wherein the first provisioned node comprises a light fixture.

15. The system of claim 13 wherein the first parameter relates to a reporting cadence, wherein the first provisioned node comprises a sensor.

16. The system of claim 10, wherein the installing device is further configured to provision a first set of unprovisioned devices with a first set of respective unicast network addresses, resulting in the first set of provisioned nodes.

17. The system of claim 10, wherein the installing device is further configured to receive the selection of the first provisioned node from a user.

18. The system of claim 10, wherein the installing device is further configured to relay messages within the mesh network.

* * * * *